United States Patent [19]

Nutter

[11] Patent Number: 4,783,106

[45] Date of Patent: Nov. 8, 1988

[54] METHOD AND APPARATUS FOR AUTOMATICALLY CONTROLLING PRESSURE IN FLUID-ACTUATED SYSTEMS

[76] Inventor: Ralph E. Nutter, 505 Belmont Ave. East, Seattle, Wash. 98102

[21] Appl. No.: 892,252

[22] Filed: Aug. 4, 1986

[51] Int. Cl.[4] ............................. B25J 15/00; B66C 3/16
[52] U.S. Cl. ........................................ 294/88; 414/621
[58] Field of Search ................ 294/88; 91/19, 28, 29, 91/32, 33; 414/621, 626, 730, 911; 901/32, 37

[56] References Cited

U.S. PATENT DOCUMENTS

| | | | |
|---|---|---|---|
| 715,365 | 12/1902 | French | 91/29 |
| 1,103,036 | 7/1914 | Clark | 91/29 |
| 2,545,260 | 3/1951 | Cole | 91/29 |
| 3,168,203 | 2/1965 | Gallistel . | |
| 3,241,687 | 3/1966 | Orloff . | |
| 3,905,635 | 9/1975 | Esser | 294/88 |
| 4,313,633 | 2/1982 | Muntjanoff et al. | 294/88 |
| 4,351,553 | 9/1982 | Rovetta et al. . | |
| 4,367,891 | 1/1983 | Wauer et al. . | |
| 4,502,723 | 3/1985 | Kuromoto | 294/88 |

FOREIGN PATENT DOCUMENTS

| | | | |
|---|---|---|---|
| 3245714 | 9/1983 | Fed. Rep. of Germany | 294/88 |
| 33254 | 3/1977 | Japan | 294/88 |
| 872255 | 10/1981 | U.S.S.R. | 294/88 |
| 906896 | 2/1982 | U.S.S.R. | 294/88 |
| 960008 | 9/1982 | U.S.S.R. | 294/88 |
| 82/01156 | 4/1982 | World Int. Prop. O. | 294/88 |

Primary Examiner—Johnny D. Cherry
Attorney, Agent, or Firm—Christensen, O'Connor, Johnson & Kindness

[57] ABSTRACT

The invention provides a method and apparatus for controlling the level of clamping pressure applied by a clamp to a load. A pump, whose output is controlled by a normally open valve, establishes an initial level of clamping pressure. Through the use of a number of controllable fluid discharge systems, this pressure is automatically increased in increments depending upon the resistance of the load to the clamping pressure exerted. In a preferred embodiment, the controllable fluid discharge systems include discharge cylinders that contain predetermined volumes of fluid dischargeable by free-floating pistons residing therein. The outputs of the discharge cylinders are controlled by pressure-responsive valves to produce the desired relationship between clamp pressure and load rigidity.

24 Claims, 2 Drawing Sheets

METHOD AND APPARATUS FOR AUTOMATICALLY CONTROLLING PRESSURE IN FLUID-ACTUATED SYSTEMS

FIELD OF THE INVENTION

This invention relates to fluid-actuated systems and, more particularly, to methods and apparatus for automatically controlling the pressure in such systems.

BACKGROUND OF THE INVENTION

Fluidic pressure is employed in a variety of applications requiring the application of pressure to a workpiece or load. For example, fluidic pressure can be used to actuate clamps that hold a workpiece securely in place on a piece of industrial equipment. Similarly, clamps used to grasp a load for lifting can be actuated by fluidic pressure. Specific applications include the use of fluid-actuated robot arms in manufacturing plants and hostile work environments, as well as fluid-actuated forklifts used when the weight or bulk of a load makes it inconvenient for human handling. The fluidic pressure developed can be above or below (vacuum) that of the atmosphere and the type of fluid employed can be either hydraulic or pneumatic.

A particular application of interest involves the use of a single set of fluid-actuated clamps to lift loads that can be light and soft or relatively heavy and hard. One of the problems encountered in using a fluid-actuated system in this application is the need to control the pressure applied by the clamps to the different loads. For a relatively soft, light load, a light pressure must be applied to lift the load without damage. A relatively hard, heavy load, however, requires the application of additional clamp pressure to produce a grasp that is firm enough to lift the load. Because of the relatively rigid nature of the load, the additional pressure applied does not damage the load. This level of pressure would, however, tend to crush the relatively soft, light load.

To produce the level of clamp pressure required to lift the load without damage, some adjustment in fluidic pressure must be made for the various loads lifted. The use of a single, pressure limit switch controlling the supply of fluid to the clamps would clearly be inadequate. With the switch adjusted to provide the pressure needed to lift a hard, heavy load, relatively soft, light loads would be crushed. On the other hand, with the switch adjusted to prevent the establishment of pressure sufficient to damage light loads, relatively heavy loads could not be lifted.

One device that seems to address the foregoing problem is that disclosed in U.S. Pat. No. 3,168,203 (Gallistel). The Gallistel apparatus provides an operator with a tactile sense of the pressure exerted by a hydraulic actuator upon a load. In response to the tactile sense experienced, the operator tightens or loosens the manual pressure applied to a handgrip that controls the actuator. In this manner, the pressure applied to the load is correspondingly increased or decreased. While the Gallistel apparatus appears capable of grasping and lifting dissimilar loads without damage, it suffers the distinct disadvantage of requiring feedback from a human operator. In many applications, an automatic system, free from human involvement, is desired. It is this problem to which the present invention is addressed.

SUMMARY OF THE INVENTION

In accordance with this invention, an apparatus is provided for automatically controlling the force applied by a clamp to a load. The clamp is typically closably actuated by the introduction of fluid into a clamp actuator cylinder controlled by the apparatus.

In accordance with a particular aspect of this invention, an initial predetermined fluid pressure is developed in the actuator cylinder by a portion of the apparatus including a reservoir containing a supply of fluid, an initial conduit connecting the reservoir and actuator cylinder, a pump for transferring fluid from the reservoir to the actuator cylinder, and a normally open valve interrupting the conduit between the pump and actuator cylinder. Pursuant to this arrangement, fluid is transferred from the reservoir to the actuator cylinder until the initial predetermined pressure in the actuator cylinder is reached, closing the normally open valve. Upon establishment of the initial predetermined pressure in the actuator cylinder, a first predetermined volume of fluid is then discharged to the actuator cylinder. This is accomplished by a first cylinder connected in parallel with the initial conduit and containing a first free-floating piston. When the normally open valve closes, the first piston is displaced in the cylinder, discharging the first volume of fluid to the actuator cylinder.

In accordance with another aspect of this invention, a second cylinder and normally closed valve are placed in parallel with the first cylinder. The normally closed valve opens only when the discharge by the first cylinder increases the pressure in the actuator cylinder by a predetermined amount. At that time, a second free-floating piston located in the second cylinder discharges a second predetermined volume of fluid from the second cylinder to the actuator cylinder. In this manner, additional pressure is applied to the load by the actuating cylinder only when the load is relatively rigid, thereby protecting soft, light loads from damage.

In accordance with a further aspect of this invention, at least one additional controllable fluid discharge cylinder is employed similar to the second cylinder. The output of the additional cylinder is controlled by a normally closed valve that opens only when the discharge of the second volume of fluid to the actuator cylinder increases the pressure in the actuator cylinder by an additional predetermined amount. When this occurs, an additional predetermined volume of fluid, within the additional cylinder, is discharged to the actuating cylinder. By selecting the desired number of additional cylinders employed, and their respective additional volumes of fluid and additional operating pressures, a continuum of pressure adjustments can be provided, as desired.

In accordance with another aspect of this invention, a method is provided for automatically controlling the force applied by a clamp to a load. The method includes the steps of applying a first predetermined level of force to the clamp, which transfers the force to the load in a predetermined manner, and applying a second incremental level of force to the clamp when the first predetermined level of force is reached. The method may further include the step of applying an additional incremental level of force to the clamp when the load exhibits a predetermined resistance to the application of the second incremental level of force to the clamp.

In accordance with a particular aspect of this invention, the above method includes the steps of producing an initial predetermined pressure in the actuator cylinder and discharging a first predetermined volume of fluid to the actuator cylinder when that initial predetermined pressure is reached.

The method may also include the steps of discharging a second predetermined volume of fluid to the actuator cylinder when the discharge of the first volume of fluid increases the pressure in the actuator cylinder by a predetermined amount and discharging at least one additional predetermined volume of fluid to the actuator cylinder when the pressure in the actuator cylinder exceeds an additional predetermined pressure.

BRIEF DESCRIPTION OF THE DRAWINGS

The invention will presently be described in greater detail, by way of example, with reference to the accompanying drawings wherein.

DETAILED DESCRIPTION OF THE PREFERRED EMBODIMENT

Figure 1:
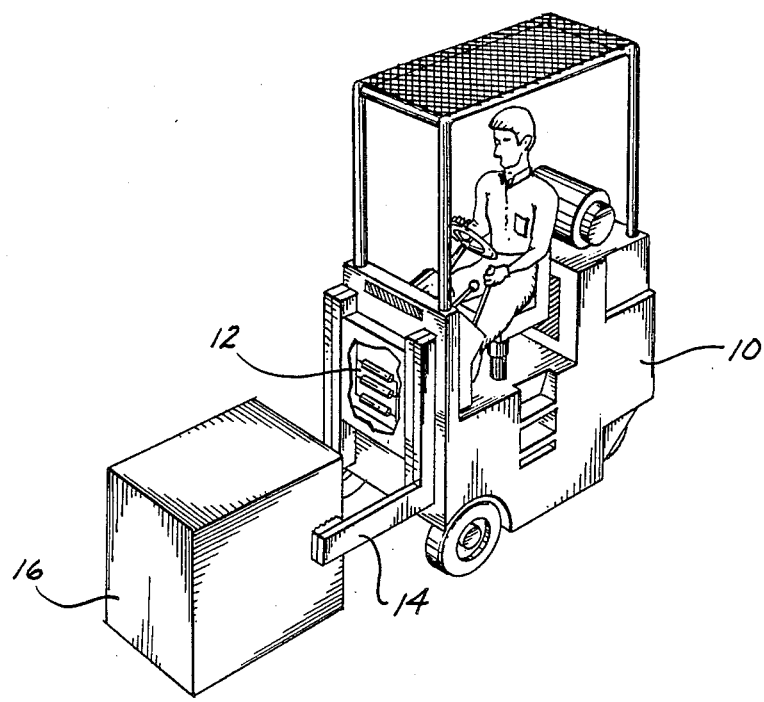
FIG. 1 is a pictorial view of a forklift employing the method and apparatus of the present invention to lift loads of various weights and rigidity without damage.

As shown in FIG. 1, one application for the method and apparatus of the present invention is the control of clamping force developed by a forklift 10. A pressure control system 12, connected to forklift clamps 14, controls the pressure exerted by clamps 14 upon load 16. The pressure is automatically controlled in a manner that allows both hard, heavy loads and soft, light loads to be lifted without damage. Pressure control system 12 is fluid actuated and may be either hydraulic or pneumatic, although in the currently preferred embodiment a hydraulic system is employed. While both clamps 14, as described below, are fluid actuated, it will be appreciated that only one of the clamps need be controlled in this manner, with the position of the other being fixed.

Figure 2:
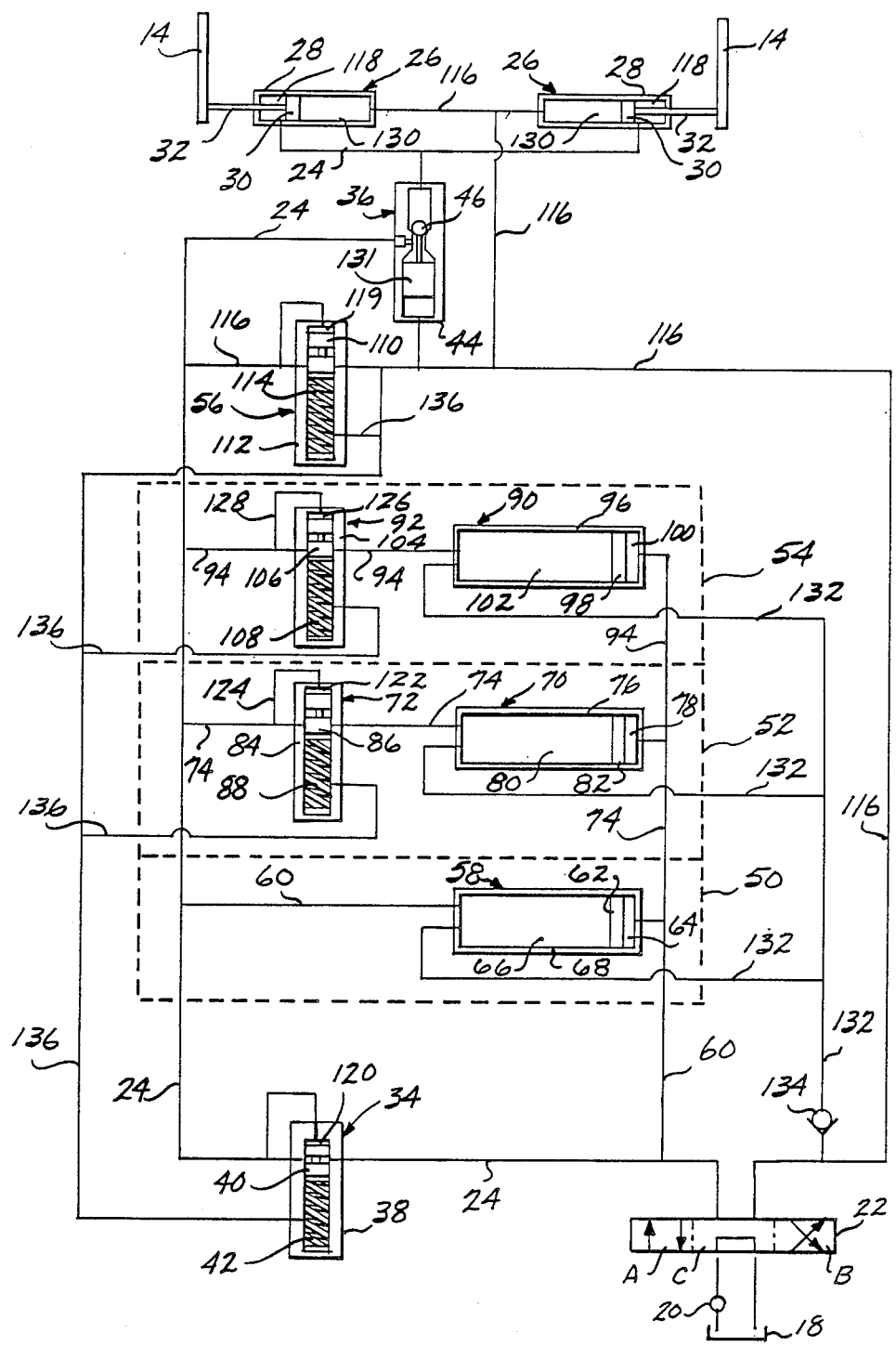
FIG. 2 is a schematic diagram of a fluid-actuated system, constructed in accordance with the present invention, at an initial operating point.

The method and apparatus of the present invention will now be considered in greater detail with respect to FIG. 2. System 12 is actuated by a hydraulic fluid selected on the basis of a number of factors. These factors include, for example, the desired viscosity, viscosity index, pour point, compressibility, stability, lubricating ability, volatility, aeration resistance, and materials compatability of the fluid.

A reservoir 18 is included in system 12 and serves a number of functions. Its primary use is to provide a convenient source of fluid for pump 20, which supplies the remainder of system 12 with pressurized hydraulic fluid. Reservoir 18 includes enough fluid to allow the system to operate properly during cylinder extension or in the event of a small leak. The construction of reservoir 18, and volume of fluid contained therein, also allows turbulent fluid returning from system 12 to settle and de-aerate. This function of reservoir 18 provides a higher quality hydraulic fluid for reintroduction into system 12 by pump 20. In applications where the operation of system 12 raises the temperature of the hydraulic fluid, reservoir 18 can also be used to exchange heat between the fluid and the environment of the reservoir 18, cooling the hydraulic fluid. Reservoir 18 can be integral with, or separate from, the remainder of system 12 and is typically located so that gravity aids the return of fluid through system 12 to reservoir 18.

Pump 20 is typically of the positive-displacement type used for fluid-power applications. Its function is to transfer fluid from reservoir 18 into, and through, system 12. The pressure rating, volumetric flow output, efficiency, fluid compatibility, and size and weight of pump 20 are selected for compatibility with the remainder of system 12.

A three-position, manually actuated control valve 22 controls the output of pump 20 as well as the inlet to reservoir 18. Valve 22 is typically of the spool, poppet, or slide mechanism type. In a first position, A (see FIG. 2), valve 22 allows fluid to pass from pump 20 through the portion of system 12 that causes clamps 14 to close. In a second position, B, valve 22 allows pump 20 to feed the portion of system 12 responsible for opening clamps 14. In a third position, C, system 12 is hydraulically isolated from both reservoir 18 and pump 20.

A conduit 24 conducts fluid from pump 20 and control valve 22 to clamp actuator cylinders 26. Conduit 24 can be made of pipe, tubing, or hose selected in consideration of a number of factors. These factors include, for example, the maximum system pressure expected, conduit flexibility requirements, the need for system disassembly, the fluid type involved, and the expected system operating temperature. Many of these same factors also effect the size and construction details of the particular conduit type selected. Although not shown in FIG. 2, conduit 24 is attached to the various system components by fittings constructed to provide connections of the requisite integrity.

Actuator cylinders 26 are typically cylinders of the double-acting, forced-return type. The body 28 of each actuator cylinder 26, in cooperation with a piston 30, defines a pressure chamber open to conduit 24 and into which hydraulic fluid is introduced by the action of pump 20. A rod 32 is connected to piston 30 and extends through one end of body 28 where it is connected to clamp 14. As will be apparent, introduction of fluid into the actuator cylinder chamber exerts a force against piston 30, causing clamps 14 to apply force to load 16. The mounting details, size, seals, and pressure rating of actuator cylinders 26 are selected in accordance with the requirements of the particular application.

A normally open control valve 34 and check valve 36 interrupt conduit 24 between control valve 22 and actuator cylinders 26. Normally open valve 34 includes a body 38 defining a chamber in which a spooled piston 40 resides. The position of piston 40 within valve 34 is biased by a coiled cylindrical spring 42. In this position, the reduced diameter midsection of piston 40 is aligned with conduit 24 inlet and outlet ports provided on valve 34, allowing fluid communication therethrough.

Check valve 36 includes a body 44 having a restricted inner diameter at a point adjacent the inlet port of conduit 24. A ball 46 seats against the reduced diameter portion of body 44 downstream (toward actuator cylinders 26) of the inlet port. This configuration allows fluid pumped through conduit 24 to pass through check valve 36 to actuator cylinders 26. Pressurized fluid in the actuator cylinders 26 is, however, prevented from returning through conduit 24 and check valve 36 because the pressure of the fluid seats ball 46 firmly against the reduced diameter portion of check valve body 44, blocking the flow therethrough.

The portion of system 12 described so far, except actuator cylinders 26 and clamps 14, is used to establish an initial predetermined pressure in actuator cylinders 26. While a detailed description of the operation of this portion of system 12 is given below, the remaining elements of system 12 will first be described. These elements include a first source of controlled fluid discharge 50, a second source of controlled fluid discharge 52, an additional source of controlled fluid discharge 54, and a relief valve 56.

As shown in FIG. 2, the first source of controlled fluid discharge 50 includes a first discharge cylinder 58 located along a conduit 60 that is connected in parallel with the portion of conduit 24 containing normally open control valve 34. A free-floating piston 62 is disposed within first cylinder 58 and separates pump-end and clamp-end chambers 64 and 66, respectively, defined within the body 68 of first cylinder 58.

The second source of controlled fluid discharge 52 includes a second discharge cylinder 70 whose output is controlled by a normally closed control valve 72. Cylinder 70 and valve 72 interrupt a conduit 74 connected in parallel with conduit 60. The body 76 of second cylinder 70 defines pump-end and clamp-end chambers 78 and 80 separated by a free-floating piston 82.

Normally closed control valve 72 includes a body 84, which houses a spooled piston 86. Piston 86 is normally biased by a coiled, cylindrical spring 88 such that piston 86 blocks the flow of fluid from second cylinder 70 through valve 72 and conduit 74.

As shown in FIG. 2, system 12 may include one or more additional sources of controlled fluid discharge 54. Each additional discharge source 54 includes an additional discharge cylinder 90 whose output is controlled by a normally closed control valve 92. These components interrupt a conduit 94 placed in parallel with conduit 74. Additional discharge cylinder 90 includes a body 96, which, together with a free-floating piston 98, defines pump-end and clamp-end chambers 100 and 102, respectively.

Normally closed control valve 92 includes a body 104 having a spooled piston 106 disposed therein. A coiled, cylindrical spring 108 biases piston 106 to block the flow of fluid from additional cylinder 90 through valve 92 and conduit 94.

Finally, relief valve 56 is a normally closed valve constructed similarly to valves 72 and 92. A spooled piston 110 is provided in valve body 112. Piston 110 is biased by a coiled, cylindrical spring 114 to restrict fluid flow through a conduit 116 connecting the clamp ends of conduits 60, 74, and 94, to the reservoir side of control valve 22.

The operation of the above embodiment of system 12 will now be described. As illustrated in FIG. 2, system 12 is at rest and no pressure is exerted upon the load or workpiece. When the manually actuated control valve 22 is switched to its closed position, however, the pump 20 supplies fluid from reservoir 18 and sends it through conduit 24, normally open valve 34, and check valve 36 to retraction chambers 118 in actuator cylinders 26. As fluid is introduced into the retraction chambers 118, rods 32 retract into cylinders 26, drawing clamps 14 against the load or workpiece.

Once clamps 14 contact the load, the physical presence of the load interferes with the further retraction of rods 32 into cylinders 26. Thus, as pump 20 continues to supply fluid from reservoir 18 to conduit 24, the pressure in conduit 24 and retraction chambers 118 increases. This increase in pressure is also experienced by the fluid in compression chamber 120 of normally open valve 34. Compression chamber 120 is located on the side of piston 40 opposite spring 42 and is connected to the actuator cylinder side of conduit 24 by a branch of that conduit. Thus, as the pressure in conduit 24, retraction chambers 118 and compression chamber 120 increases, the force applied to the side of piston 40 opposite spring 42 increases. This process continues until the pressure in chamber 120 is sufficient to overcome the force of spring 42 and move piston 40 from its normally open position to a position blocking conduit 24. By properly configuring spring 42, the flow of fluid through conduit 24 directly from pump 20 can be halted when a desired, predetermined pressure in retraction chambers 118 of actuator cylinders 26 is reached. Because the force applied to the load or workpiece is proportional to the pressure in retraction chamber 118, it is clear that valve 34, constructed in the foregoing manner, closes when a predetermined amount of force is applied by clamps 14 to the load.

Prior to the actual closure of normally open control valve 34, the first source of controlled fluid discharge 50 becomes operative. The initial position of free-floating piston 62 is such that clamp-end chamber 66 constitutes a substantial portion of the interior of cylinder 58. Both the pump-end and clamp-end chambers 64 and 66 are filled with fluid. As the piston 40 in normally open valve 34 moves toward its closed position, the action of pump 20 begins to cause additional fluid to flow through conduit 60 and into the pump-end chamber 64 of the cylinder 58. The continued action of pump 20 causes the pressure in the pump-end chamber 64 to exceed that in the clamp-end chamber 66, driving piston 62 through cylinder 58 and forcing the hydraulic fluid from clamp-end chamber 66. Because the initial volume of fluid in clamp-end chamber 66 can be controlled, a first predetermined volume of fluid is introduced into conduit 24 and retraction chambers 118 after valve 34 closes.

In the event that the load or workpiece is relatively soft, the introduction of this first predetermined volume of hydraulic fluid into conduit 24 and chambers 118 of actuator cylinders 26 causes rods 32 to retract farther into cylinders 26. The load or workpiece simply gives under the pressure exerted by clamps 14. Because the volume of retraction chambers 118 is expanded accordingly, the pressure of the fluid in chambers 118 and conduit 24 is not increased substantially.

On the other hand, if the load or workpiece is relatively hard, rods 32 are unable to retract much farther into actuator cylinders 26 when the predetermined volume of fluid is discharged from chamber 66 of first cylinder 58. Thus, because the volume of retraction chamber 118 does not change substantially, the pressure in retraction chambers 118 and conduit 24 increases.

The response of the second source of controlled fluid discharge 52 to these differences in loads will now be considered. As shown in FIG. 2, normally closed valve 72 includes a compression chamber 122 adjacent the end of spool 86 opposite spring 88. Chamber 122 is connected by a conduit 124 to the clamp side of conduit 74. Thus, when a relatively hard load is clamped, the increased fluid pressure experienced by conduit 24 is communicated to compression chamber 122. This pressure exerts a force against piston 86 that counters the force of spring 88.

If the load is rigid enough, the pressure developed in chamber 122 will be sufficient to overcome the force exerted by spring 88 and valve 72 will open. At this point, the reduced diameter portion of piston 86 is aligned with the ports in valve 72 provided for conduit 74. Once valve 72 is open, the action of pump 20 causes the pressure in the pump-end chamber 78 of cylinder 70 to exceed that in the clamp-end chamber 80, driving piston 82 therethrough. In this manner, the predetermined volume of hydraulic fluid contained in the clamp-end chamber 80 is discharged through conduit 74 and valve 72 to conduit 24 and the actuator cylinders 26.

If, on the other hand, load 16 had been relatively yielding to the force applied by clamps 14, the pressure in conduit 24 would not have risen appreciably. In that case, the pressure in compression chamber 122 of normally closed valve 72 would have been insufficient to open valve 72. Thus, it is apparent that the predetermined volume of hydraulic fluid is only supplied to actuator cylinders 26 when a relatively resistant load is involved. In this manner, soft loads are protected from the damage that could result from the application of additional force by clamps 14. Because such loads are typically relatively light, the initial amount of force established usually provides clamps 14 with sufficient grasp to allow the load to be easily lifted. For relatively hard loads, however, additional force can be applied by clamps 14 to the load without damage and, in fact, this additional force is required if the load 16, which is typically relatively firm and heavy, is to be lifted.

At this point, the operation of an additional source of controlled fluid discharge 54 will be considered. The normally closed valve 92 of the second discharge means 52 includes a compression chamber 126 located adjacent the end of piston 106 opposite spring 108. Compression chamber 126 is connected by conduit 128 to the clamp end of conduit 94. Spring 108 biases piston 106 with greater force than the arrangement of valve 72. Thus, valve 92 will open only if the discharge of hydraulic fluid from second discharge cylinder 70 into conduit 24 and actuator cylinders 26 increases the pressure therein by a predetermined amount over that required to open valve 72. Again, this requires that the load exhibit a predetermined amount of resistance to the pressure applied by clamps 14 when the second cylinder 70 discharges fluid into the actuator cylinders 26.

If the load is of somewhat intermediate softness, it may give slightly, allowing rods 32 to retract in cylinders 26. The increased volume of retraction chambers 118 prevents the pressure in retraction chambers 118, conduit 24, and compression chamber 126 from increasing enough to open valve 92. In that case, cylinder 96 is unable to discharge and no additional pressure is applied to the load, thereby protecting the intermediately soft load from possible damage by increased pressure.

If the load substantially resists the pressure applied by clamps 14 when fluid is discharged by the second cylinder 70, the volume of retraction chambers 118 remains relatively unchanged and the pressure therein increases. In that case, the fluid pressure in compression chamber 126 also increases and, when it reaches a predetermined level, the force of spring 108 is overcome, opening valve 92 and allowing additional cylinder 96 to discharge through conduits 94 and 24 to actuator cylinders 26. Thus, in the arrangement shown in FIG. 2, an additional amount of fluid is introduced into conduit 24 and retraction chambers 118, causing clamps 14 to apply a greater amount of force to the load.

It will be readily appreciated that a plurality of such additional sources 54 could be employed, each having a normally closed valve 92 that opens at a successively higher pressure. By properly selecting the volume of fluid contained in the clamp-end chamber of each cylinder, as well as the operating pressure of each normally closed valve, the application of additional pressure by clamps 14 to the load can be substantially any function of the rigidity of the load desired. Thus, the increase in pressure applied by clamps 14 to the load can be substantially directly proportional to the rigidity of the load. In another arrangement, the first increments in clamp pressure produced after normally open valve 34 closes are relatively large, with each additional incremental discharge of fluid into the retraction chambers 118 becoming smaller as more fluid is introduced. This effectively produces a coarse control initially, which becomes finer as additional pressure is applied by clamps 14.

It will also be appreciated that other methods of controlling fluid discharge to the actuator cylinders 26 can be employed. For example, pressure-sensitive electric switches can be used to actuate electromechanical valves controlling the output of the cylinders shown. In addition, a single valve can be used to repetitively initiate and interrupt the flow of fluid from a single, larger discharge cylinder, thereby simulating the effect of the multiple controlled discharge cylinders discussed above.

To prevent the pressure in actuator cylinders 26 from exceeding the maximum safe rating of the cylinders, relief valve 56 provides a path by which pressurized fluid can escape retraction chambers 118 and return to reservoir 18. As shown in FIG. 2, chambers 118 are in fluid communication with a compression chamber 119 of valve 56. When the pressure in chambers 118 reaches the maximum safe pressure, the force of spring 114 against piston 110 is counteracted, opening valve 56. In this manner, pressurized fluid in chambers 118 returns to reservoir 18 through conduit 116.

Once clamps 14 are fully closed, the manually actuated control valve 22 can be switched to a neutral position C and fluid communication between pump 20, reservoir 18, and the remainder of system 12 is halted. When valve 22 is switched to the clamp open position B, the outlet of pump 20 is connected to a conduit 116 that feeds expansion chambers 130 of actuator cylinders 26. Thus, the action of pump 20 increases the pressure in the expansion chambers 130 and, at the same time, applies this increased pressure to a piston 131 located in check valve 36. Ultimately, piston 131 unseats ball 46, opening check valve 36. In this manner, fluid is allowed to escape from the retraction chambers 118 of actuator cylinders 26 and the pressure in the expansion chambers 130 causes the clamps 14 to open.

While the clamps 14 are opening, fluid is also being introduced into a group of conduits 132 that feed the clamp-end chambers 66, 80, and 102 of the first, second, and additional discharge cylinders 58, 70, and 90, respectively. The introduction of this fluid causes the piston in each cylinder to return to its original position for subsequent operation. A check valve 134 placed in the main conduit 132 prevents loss of fluid through conduits 132 when the various cylinders discharge in the clamp-closing mode. A group of conduits 136 provide return pressure feed paths to the portions of control valves 34, 56, 72, and 92, containing the cylindrical springs 42, 88, 108, and 114. The introduction of fluid through conduits 136 when valve 22 is opened assists the various springs in returning their associated valves to their normal position.

It will be understood that the disclosed invention also includes a method of automatically controlling the pressure in a fluid-actuated system. In brief, the method is as follows, with the details being readily appreciable from the foregoing discussion. Initially, a predetermined pressure is established in the retraction chambers 118 of actuator cylinders 26 to provide a desired application of force by clamps 14 to the load. When this pressure is reached, a first, predetermined volume of hydraulic fluid is discharged to the retraction chambers 118. Only if the load is relatively hard and can withstand the application of additional force by clamps 14 will this discharge of hydraulic fluid increase the pressure in the retraction chambers 118. In that case, the step of discharging a second, predetermined volume of fluid to the retraction chambers 118 of actuator cylinders 26 is performed. Again, dependent upon the characteristics of the load to be lifted, additional hydraulic fluid may be introduced to produce even greater clamping pressure. As will be readily appreciated, pursuant to this method, the force applied by clamps 14 to the load is automatically made dependent upon the resistance of the load to the application of additional force. Additional steps of introducing further predetermined volumes of hydraulic fluid into the retraction chambers 118 of actuator cylinders 26 can be provided as desired.

Those skilled in the art will recognize that the embodiments of the invention disclosed herein are exemplary in nature and that various changes can be made therein without departing from the scope and the spirit of the invention. In this regard, and as was previously mentioned, variations in the amount of hydraulic fluid discharged by the various cylinders can be used to provide the desired response of the system to the load characteristics. In addition, numerous arrangements for producing controlled discharges of hydraulic fluid to the actuator cylinders can be employed. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. An apparatus, for automatically controlling the pressure applied by a clamp to a load, said clamp being closably actuated by the introduction of a fluid into a clamp actuator cylinder operatively coupled to said clamp, said apparatus comprising:
   initial pressure establishment means, connected to said actuator cylinder, for producing an initial predetermined pressure in said actuator cylinder; and
   first controllable fluid discharge means, connected to said actuator cylinder, for discharging a first predetermined volume of said fluid to said actuator cylinder when said initial predetermined pressure in said actuator cylinder is reached.

2. The apparatus of claim 1, further comprising second controllable fluid discharge means, connected to said actuator cylinder, for discharging a second predetermined volume of said fluid to said actuator cylinder when the discharge of said first volume of fluid to said actuator cylinder increases the pressure in said actuator cylinder by a predetermined amount.

3. The apparatus of claim 2, further comprising at least one additional controllable fluid discharge means, connected to said actuator cylinder, for discharging an additional predetermined volume of fluid to said actuator cylinder when the pressure in said actuator cylinder exceeds an additional predetermined pressure, said additional volume of fluid and said additional pressure being separately determined for each said additional fluid discharge means employed.

4. The apparatus of claim 2, wherein said clamp is closably actuated by a pair of clamp actuator cylinders connected to said first and second means.

5. The apparatus of claim 2, further comprising a pressure-relief valve for allowing said fluid in said actuator cylinder to escape if the pressure in said actuator cylinder exceeds a predetermined relief pressure.

6. An apparatus for automatically controlling the pressure applied by a clamp to a load, said clamp being closably actuated by the introduction of a fluid into a clamp actuator cylinder operatively coupled to said clamp, said apparatus comprising:
   pressure establishment means for transferring fluid to said actuator cylinder;
   an initial conduit connecting said pressure establishment means to said actuator cylinder;
   valve means for interrupting the flow of fluid in said initial conduit between said pressure establishment means and said actuator cylinder, said valve means interrupting the flow of fluid when an initial pressure in said actuator cylinder is reached;
   first controllable fluid discharge means, connected to said actuator cylinder, for discharging a first predetermined volume of said fluid to said actuator cylinder when said initial predetermined pressure in said actuator cylinder is reached; and
   second controllable fluid discharge means, connected to said actuator cylinder, for discharging a second predetermined volume of said fluid to said actuator cylinder when the discharge of said first volume of fluid to said actuator cylinder increases the pressure in said actuator cylinder by a predetermined amount.

7. The apparatus of claim 6, wherein said valve means comprises a normally open valve and wherein said first fluid discharge means comprises:
   a first conduit, connected in parallel to said normally open valve; and
   a first discharge cylinder interrupting said first conduit between said pressure establishment means and said actuator cylinder, said first cylinder including a first freefloating piston disposed between a pressure establishment means-end of said first cylinder and an actuator end, said pressure establishment means introducing fluid into said pressure establishment means-end of said first cylinder and forcing said first piston toward said actuator end of said first cylinder when said normally open valve closes, discharging said first volume of said fluid to said actuator cylinder.

8. The apparatus of claim 7, wherein said second fluid discharge means comprises:
   a second conduit, connected in parallel to said normally open valve;
   a second discharge cylinder interrupting said second conduit between said pressure establishment means and said actuator cylinder, said second cylinder including a second free-floating piston disposed between a pressure establishment means-end of said second cylinder and an actuator end; and
   a normally closed valve interrupting said second conduit between said second discharge cylinder and said actuator cylinder, said pressure establishment means introducing fluid into said pressure establishment means-end and forcing said second piston toward said actuator end of said second cylinder when said normally closed valve opens, discharging said second volume of said fluid to said actuator cylinder, said normally closed valve opening when the pressure in said actuator cylinder increases by said predetermined amount.

9. The apparatus of claim 8, further comprising at least one additional controllable fluid discharge means, connected to said actuator cylinder, for discharging an additional predetermined volume of fluid to said actuator cylinder when the pressure in said actuator cylinder exceeds an additional predetermined pressure, said additional volume of fluid and said additional pressure being separately determined for each said additional fluid discharge means employed.

10. The apparatus of claim 9, wherein said additional fluid discharge means comprises:
an additional conduit, connected in parallel to said normally open valve;
an additional discharge cylinder interrupting said additional conduit between said pressure establishment means and said actuator cylinder, said additional cylinder including an additional free-floating piston disposed between a pressure establishment means-end of said additional cylinder and an actuator end; and
an additional normally closed valve interrupting said additional conduit between said additional discharge cylinder and said actuator cylinder, said pressure establishment means introducing fluid into said pressure establishment means-end and forcing said additional piston toward said actuator end of said additional cylinder when said additional normally closed valve opens, discharging said additional volume of said fluid to said actuator cylinder, said additional normally closed valve opening when the pressure in said actuator cylinder exceeds said additional pressure.

11. The apparatus of claim 10, further comprising a pressure-relief valve for allowing said fluid in said actuator cylinder to return to said reservoir if the pressure in said actuator cylinder exceeds a predetermined relief pressure.

12. An apparatus, for controlling the pressure developed by the introduction of a fluid into an actuator cylinder, said fluid stored initially in a reservoir and withdrawn from said reservoir by a pump, said apparatus comprising:
first controllable fluid discharge means, connected to said actuator cylinder, for discharging a first predetermined volume of said fluid to said actuator cylinder; and
second controllable fluid discharge means, connected to said actuator cylinder, for discharging a second predetermined volume of said fluid to said actuator cylinder when the discharge of said first volume of fluid to said actuator cylinder increases the pressure in said actuator cylinder by a predetermined amount.

13. An apparatus for controlling the pressure developed by the introduction of a fluid into an actuator cylinder from a fluid source, said apparatus comprising:
first controllable fluid discharge means for discharging a first predetermined volume of said fluid to said actuator cylinder, said first fluid discharge means comprising a first discharge cylinder having a first free-floating piston disposed between a source-end of said first cylinder and an actuator end, said source being for introducing fluid into said source-end and forcing said first piston toward said actuator end of said first cylinder when said pressure in said actuator cylinder exceeds a first predetermined pressure, discharging said first volume of fluid to said actuator cylinder; and
second controllable fluid discharge means, connected to said actuator cylinder, for discharging a second predetermined volume of said fluid to said actuator cylinder when the discharge of said first volume of fluid to said actuator cylinder increases the pressure in said actuator cylinder by a predetermined amount.

14. The apparatus of claim 13, wherein said second fluid discharge means comprises:
a second discharge cylinder having a second free-floating piston disposed between a source-end of said second cylinder and an actuator end; and
a normally closed valve controlling the discharge of said second volume of fluid from said second cylinder, said source being for introducing fluid into said source-end and forcing said second piston toward said actuator end of said second cylinder when said normally closed valve opens, discharging said second volume of fluid to said actuator cylinder, said normally closed valve opening when the pressure in said actuator cylinder increases by said predetermined amount.

15. The apparatus of claim 14, further comprising at least one additional controllable fluid discharge means, connected to said actuator cylinder, for discharging an additional predetermined volume of fluid to said actuator cylinder when the pressure in said actuator cylinder exceeds an additional predetermined pressure, said additional volume of fluid and said additional pressure being separately determined for each said additional means employed.

16. The apparatus of claim 15, wherein said additional fluid discharge means comprises:
an additional discharge cylinder having an additional free-floating piston disposed between a source-end of said additional cylinder and an actuator end; and
an additional normally closed valve controlling the discharge of said additional volume of fluid from said additional cylinder, said source being for introducing fluid into said source-end and forcing said additional piston toward said actuator end of said additional cylinder when said additional normally closed valve opens, discharging said additional volume of fluid to said actuator cylinder, said additional normally closed valve opening when the pressure in said actuator cylinder exceeds said additional pressure.

17. The apparatus of claim 16, further comprising a pressure-relief valve for allowing said fluid in said actuator cylinder to return to said source if the pressure in said actuator cylinder exceeds a predetermined relief pressure.

18. The apparatus of claim 13, further comprising at least one additional controllable fluid discharge means, connected to said actuator cylinder, for discharging an additional predetermined volume of fluid to said actuator cylinder when the pressure in said actuator cylinder exceeds an additional predetermined pressure, said additional volume of fluid and said additional pressure being separately determined for each said additional means employed.

19. The apparatus of claim 13, further comprising a pressure-relief valve for allowing said fluid in said actuator cylinder to return to said source if the pressure in said actuator cylinder exceeds a predetermined relief pressure.

20. A method for controlling the pressure developed by the introduction of a fluid into an actuator cylinder, said method comprising the steps of:
   discharging a first, predetermined volume of fluid to said actuator cylinder; and
   discharging a second, predetermined volume of fluid to said actuator cylinder when said step of discharging said first volume of fluid to said actuator cylinder increases said pressure in said actuator cylinder by a predetermined amount.

21. The method of claim 20, further comprising the step of producing an initial predetermined pressure in said actuator cylinder before said step of discharging said first volume of fluid to said actuator cylinder.

22. The method of claim 21, further comprising the step of discharging at least one additional, predetermined volume of fluid to said actuator cylinder when the pressure in said actuator cylinder exceeds an additional, predetermined pressure, said additional volume of fluid and said additional pressure being separately determined for each said step of discharging an additional volume of fluid.

23. The method of claim 22, further comprising the step of relieving the pressure in said actuator cylinder when said pressure in said actuator cylinder exceeds a predetermined relief pressure.

24. The method of claim 20, further comprising the step of discharging at least one additional, predetermined volume of fluid to said actuator cylinder when the pressure in said actuator cylinder exceeds an additional, predetermined pressure, said additional volume of fluid and said additional pressure being separately determined for each said step of discharging said additional volume of fluid.

* * * * *